(12) United States Patent
Waschura et al.

(10) Patent No.: US 7,310,389 B2
(45) Date of Patent: Dec. 18, 2007

(54) METHOD AND APPARATUS FOR DETERMINING THE ERRORS OF A MULTI-VALUED DATA SIGNAL THAT ARE OUTSIDE THE LIMITS OF AN EYE MASK

(75) Inventors: Thomas Eugene Waschura, Menlo Park, CA (US); James R. Waschura, Menlo Park, CA (US); Senthil Kumar Thandapani, Menlo Park, CA (US)

(73) Assignee: Syntle Sys Research, Inc, Menlo Park, CA (US)

( * ) Notice: Subject to any disclaimer, the term of this patent is extended or adjusted under 35 U.S.C. 154(b) by 815 days.

(21) Appl. No.: 10/097,706

(22) Filed: Mar. 14, 2002

(65) Prior Publication Data

US 2003/0174789 A1     Sep. 18, 2003

(51) Int. Cl.
*H03D 1/00* (2006.01)
*H04L 27/06* (2006.01)

(52) U.S. Cl. ..................................... 375/340
(58) Field of Classification Search ................ 375/316, 375/340
See application file for complete search history.

(56) References Cited

U.S. PATENT DOCUMENTS 3,721,959 A * 3/1973 George ....................... 714/704
4,218,771 A * 8/1980 Hogge, Jr. ................... 375/376
5,900,755 A * 5/1999 Toeppen et al. ............ 327/163
6,806,877 B2 * 10/2004 Fernando .................... 345/440

* cited by examiner

Primary Examiner—Kevin Burd
(74) Attorney, Agent, or Firm—Peninsula IP Group; Douglas A. Chaikin

(57) ABSTRACT

Disclosed herein is a method and apparatus used to measure the number of time a multi-valued data signal transmitted from either a communication device of subsystem deviates across and into one or more bounded areas or zones as defined by an eye mask that is overlaid onto an eye diagram. The present invention employs an iterative process to accumulate and display mask violation that might result from a data signal transmitted from a target device or communications subsystem that deviates across the boundaries either above or below or into the center of the eye diagram. In addition, the present invention also has the ability to isolate particular threshold voltage-delay points along the boundaries above or below and around the perimeter of the mask polygon of the eye diagram where mask violations have occurred. This provides the ability to supply additional information and feedback about the behavior and performance of the targeted device or subsystem being tested.

32 Claims, 6 Drawing Sheets

METHOD AND APPARATUS FOR DETERMINING THE ERRORS OF A MULTI-VALUED DATA SIGNAL THAT ARE OUTSIDE THE LIMITS OF AN EYE MASK

BACKGROUND OF THE INVENTION

1. Field of the Invention

This invention relates to systems that measure the performance of a high-speed data communications channel. More precisely, the preferred embodiment of the present invention is a method and apparatus for identifying a plurality of errors of a multi-valued data signal that occur outside the boundaries of an eye mask as defined by regions above, below and in the center of an eye diagram.

2. Description of the Related Art

In recent years, the performance of a high-speed communication facility or device has risen to a point that the ability of accurately measuring its quality has become an ever-increasing challenge. In the area of data communication devices, for example, efforts to reduce size and power while increasing the throughput of a device has increased the possibility of error. Network suppliers, integrators and users want assurances that these devices will perform reliably and can accommodate data transmission rates that routinely exceed several gigabits/second. Providing such assurance requires determining the effective error rate of either the data received by or data transmitted through a high speed communications channel or device.

One approach of evaluating the performance of a high speed communications channel device or system is to use a bit error rate tester. Here, a predetermined bit pattern is transmitted through the target channel, device or system and on to the bit error rate tester. The difference between the known transmitted bit pattern and the bit stream generated by the target device or system are considered errors and are accumulated by the bit error rate tester to determine the effective bit error rate (i.e., the fraction of the received or transmitted bits that are in error) of the target device or system. Even though bit error rate testing (BER) is a relatively significant measure of performance, merely measuring the error rate of a high speed communications device or system does not provide enough data to characterize the behavior of a communications channel, device or system. As a result, instruments such as a bit error rate testers and oscilloscopes have the functionality of creating an eye diagram to facilitate characterizing a high-speed communications device or system during the various stages of development. Here, a number of voltage levels of the data signal transmitted through a high-speed communications device or system is sampled at specified instances in time. A voltage-versus-time plot of errors known as "events" that depicts the behavior and performance of the high-speed communications component or subsystem is then generated and displayed as an eye diagram, for example.

For production or manufacturing environments, generating a comprehensive series of tests that incorporates generating an eye diagram for each new component or communications subsystem is too costly and quite time consuming. One technique of a more efficient way of validating the performance of a communications device or subsystem provides a quick indication of how a communications device or system performs against an industry develop characterization and performance template commonly referred to as an eye mask. These templates have been created by a number of industry groups to assure the interoperability of components or subsystems that might be configured into a number of different communication systems. To accomplish this, a predetermined, known data signal is transmitted through the target device or subsystem to see the number of times the data signal that is generated by that device or subsystem deviates across the boundary of one or more of the zones as defined by the eye mask. If the data signal from the target device or subsystem does not deviate very many times into one or more of the zones, thereby producing only a limited number of mask violations, it is likely that the target device or subsystem will have little or no trouble operating properly and meeting or succeeding the specification of a particular application.

There are several commercially available bit error rate testing system that characterize and validate the performance of a data signal from a device or communications subsystem using a form of an eye mask or template. Systems such as Agilent Technologies' 81250 as well as the 10 Gb/sec and the older 3 Gb/sec bit error rate testing systems measure the bit error rate of the data signal from a device or communications subsystem at various decision threshold levels and clock-to-data time delays in the eye diagram. The samples of the data signal transmitted through a target device or communications subsystem that are on the wrong side of a mask boundary for the center of the eye are displayed at different bit error rate levels than those that are on the correct side of the mask perimeter.

For contrast, another known method for studying the quality of the signals involved in a digital communications system is to look at a bit error rate eye contour display. FIG. 1 is a diagram of a typical bit error rate eye contour map produced by a prior art bit error rate testing systems. FIG. 1 shows the eye contour that comprises several different bit error rate levels where each level is represented by a different graphic icon. For example, the outside contour 102 shown as a series of black circular icons designates a bit error rate of 1×10E−4 or one error in 10,000 bits. Thus, if the detector is set at this decision level and time delay, a device or communications subsystem transmitting a 2.4 Gigabits per second data signal where 2,400,000,000 bits occur in every second, the expect error rate would be 240,000 errors a second.

This type of view of signal quality is accomplished by making a plurality of bit error rate measurements at various instances in time and voltage threshold. These measurements are then used, along with the theory for randomly distributed errors, to estimate the bit error rate at a given decision threshold by making bit error rate measurements at a series of decision thresholds and extrapolating to get an estimate the bit error rate of those areas that are not actually measured. The problem with this technique is that it may take minutes, if not hours, to complete depending to what bit error rate contour measurement is desired. More importantly, these systems do not do an eye mask test but instead produce only a contour of the bit error rates of a data signal that has been transmitted through a target device or communications subsystem.

More recently, Agilent Technologies has developed a technique that performs mask-like measurements along the inside perimeter of the opening of the eye diagram. Under program control, the 81250 parallel bit error rate testing system measures the bit error rate at a specific number of points inside the opening of the eye in accordance with a supplied set of time-threshold voltage settings or parameters. This defines a set of extreme points or corners of the desired mask template and generates the results in a tabular spreadsheet-like format. Using this technique, the 81250 parallel bit error rate testing system calculates a partial mask violation report only about a polygon shaped area in the center of the eye diagram. With this technique, once the synchronization process is complete, the 81250 test system then employs up to 32 different locations inside the eye opening to form a polygon shaped template and then makes a series of quick bit error rate measurements at those locations. Even though the 81250 test system measures the bit error rate of the date signal for a finite number of points in the center of an eye diagram, it is not able to move the measuring point in areas above or below the eye diagram. As a result the 81250 test system can not measure the violations that might occur when a data signal from a target device or subsystem deviates across the boundaries and into the areas are either above or below the eye as specified by an industry standard eye mask. This is required to detect overshoot and undershoot or other signal quality degradations that manifest themselves above and/or below the eye center which does not necessarily effect the bit error rate of the transmitted signal but may effect other design limits of the device or system.

SUMMARY OF THE INVENTION

An object of the present invention is to provide a method and apparatus for identifying a plurality of errors of a multi-valued data signal that occur outside the boundaries of an eye mask as defined by regions above, below or in the middle of the eye diagram, thus, overcoming at least some of the disadvantages and limitations of as implemented in the prior art.

The above and other objects are attained by the method of measures the performance characteristics of an applied multi-valued data signals, performed by a binary data bit decision mechanism that includes receiving program instructions to test for mask violations of the applied data signal produced for a particular bounded area; configuring variable delayed trigger to generate a plurality of trigger pulses equivalent to bit rate of the applied data signal; selecting appropriate bounded area; comparing the voltage level of the applied data signal with a supplied threshold voltage; comparing the comparative results with a supplied reference bit pattern accumulating mismatched events and transmitting the results to a program element or system.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

The present invention will now be described in greater detail with reference to the accompanying drawings, in which the preferred embodiments of the invention are shown. The present invention may, however, be embodied in many different forms and should not be construed as limited to the embodiment set forth herein; rather these embodiments are provided so that this disclosure will be thorough and complete and will fully convey the invention to those skilled in the art.

The invention will now be described illustrating a method and apparatus used to measure and display the number of times a multi-valued data signal transmitted from either a communication device of subsystem deviates across the boundaries and into one or more bounded areas or zones as defined by an eye mask that has been overlaid onto an eye diagram. Unlike the prior art, the present invention employs an iterative process to accumulate and display mask violation that might result from a data signal transmitted from a target device or communications subsystem that deviates across the boundaries either above or below or into the center of the eye diagram. In addition, the present invention also has the ability to localize and isolate particular threshold voltage-delay points along the boundary lines above or below the eye diagram as well as around the perimeter of the mask polygon where mask violations have occurred so as to supply additional information and feedback about the behavior and performance of the targeted device or subsystem being tested.

Figure 1:
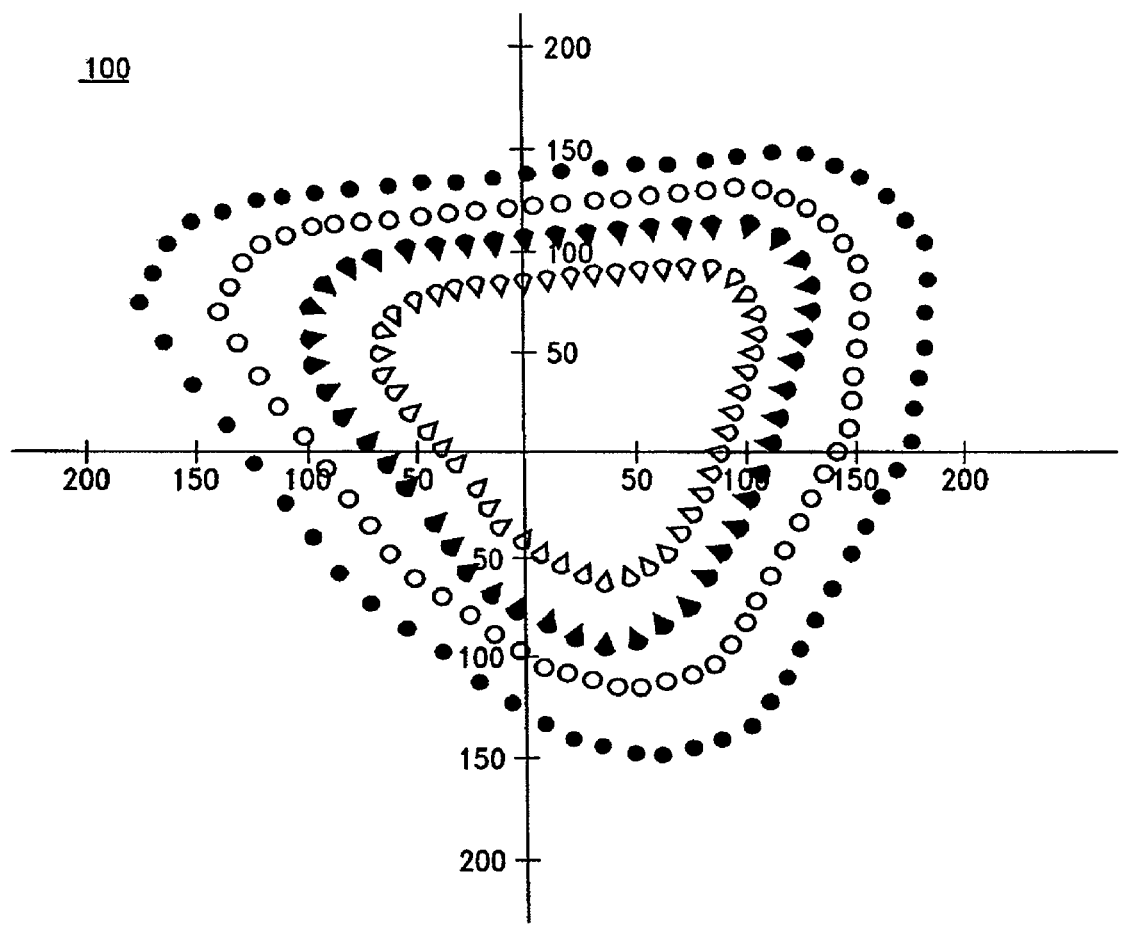
FIG. 1 is a diagram of a typical bit error rate eye contour map produced by a prior art bit error rate testing systems.
Figure 2:
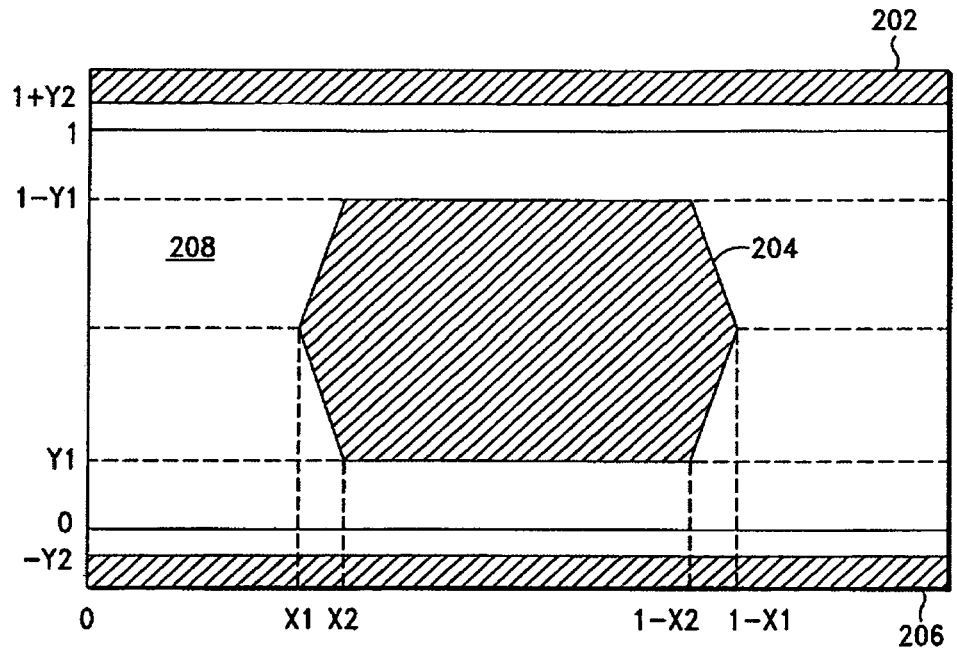
FIG. 2 is an illustrative example of an industry standard eye mask used to validate the performance of a high speed communications device or subsystem.

FIG. 2 is an illustrative example of an industry standard eye mask used to validate the performance of a high speed communications device or subsystem. Typically, a finite number of eye diagrams representing the output from a target device or subsystem can be overlaid onto a template or mask. As FIG. 2 shows the eye mask 200 is placed in the center of a representative eye diagram that is comprise of an upper mask boundary or zone 202, a middle polygon 204 and a lower mask boundary or zone 206 shown in gray. Thus, any sample that occurs above the 1+Y2 boundary is considered a violation that represents an excessively high signal level. Any samples that occur below the 0−Y2 boundary are also violations and represent a very low signal level. While those samples fall into the middle area of the mask, indicating a higher than expected error rate, will tend to close the eye opening too much to permit a satisfactory logic decision by decreasing the ability to discriminate between logic one and logic zero levels.

Figure 3:
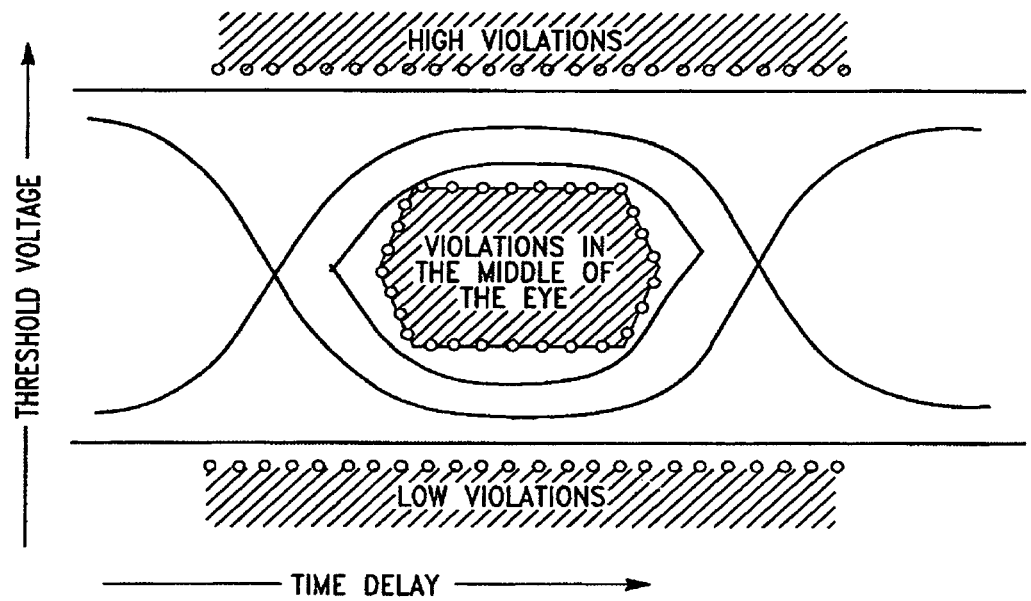
FIG. 3 is an illustrative representation showing an eye diagram of an applied data signal transmitted from a target device or subsystem that has been overlaid onto an industry standard eye mask template.

FIG. 3 is an illustrative representation showing an eye diagram of an applied data signal transmitted from a target device or subsystem that has been overlaid onto an industry standard eye mask template. FIG. 3 shows that unlike the prior art system that uses a limited number of points to form a polygon in the middle of the eye diagram, the present invention performs an iterative loop that accumulates errors or mask violations that might occur for a collection of points along the boundaries of both the upper and lower mask areas 302, 306 as well as around the perimeter of the polygon 304 positioned in the middle of an eye diagram 310. Each these points are set to a specific threshold voltage and variable delay or time setting by a separate, independent processing element or system. In the present invention, the independent processing element has been created so effectively as to allow very little overhead time between measurements. This means that many, many points can be measured quickly avoiding the traditional approach where many bits are not part of the bit error rate data because the processing element was busy trying to setup or communicate to the measuring apparatus.

Figure 4:
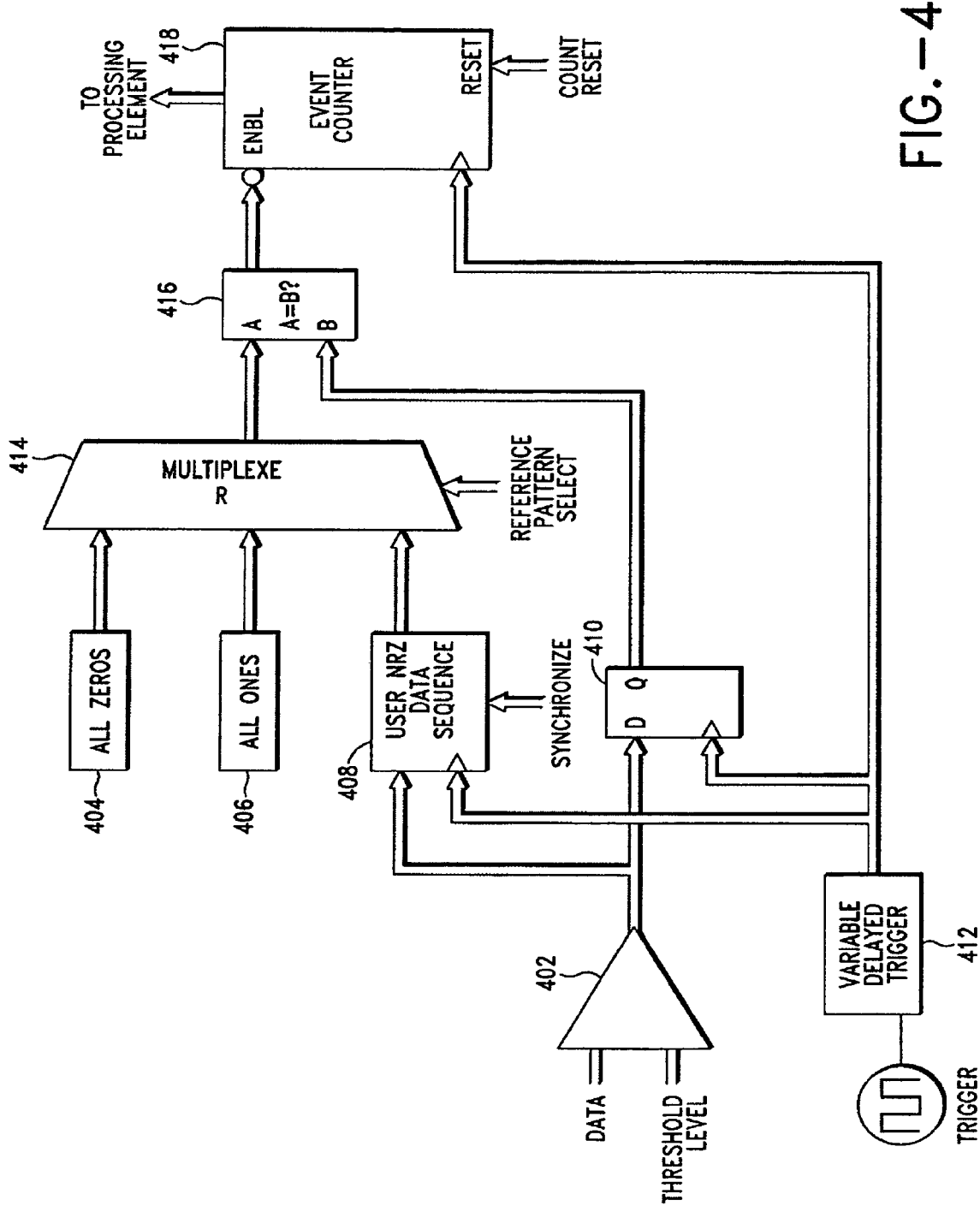
FIG. 4 illustrates the essential components or elements required to incorporate eye mask test technology and functionality into a binary data bit decision mechanism such as a bit error rate tester in accordance of the present invention.

FIG. 4 illustrates the essential components or elements required to incorporate eye mask test technology and functionality into a binary data bit decision mechanism such as a bit error rate tester in accordance of the present invention. The eye mask violation detector 400 is controlled by a processing element or system (not shown). Here, the processing element or system sets and changes threshold voltage levels, variably delayed trigger, selects reference pattern, performs synchronization and count resets_and processes all mask segment violations and compiles them into a mask-violation report. As FIG. 4 shows, the essential operative elements of the eye mask violation detector 400 include a decision comparator 302, a variable delayed trigger 412, a sampling flip-flop 410, a multiplexer 414, used to introduce the appropriate reference pattern to a reference comparator 416 and an event counters 418. The decision comparator 402 receives and compares the voltage level of the data signal ($V_s$) from a target device or subsystem against a prescribed threshold voltage ($V_T$) that can be either above or below the voltage level of the applied data signal. If the voltage level ($V_S$) is different then that of the threshold voltage ($V_T$), the output from that decision comparator goes high and sets the bit sampling flip-flop 410. In addition, a series of triggered pulses are also supplied to the bit sampling flip-flop 410 from the variable delay trigger 410.

As FIG. 4 shows the output from decision comparator 402 as well as the output of a trigger pulse from variable delayed trigger 412 is applied to bit sampling flip-flop 410. The bit sampling flip-flop 410 then, in turn, generates a sequence of bits that indicate that the voltage level of the applied data signal is either above or below the threshold voltage for a specified instance in time. The resultant output from the bit sampling flip-flop 410 is then supplied to reference comparator 416 along with a reference bit pattern from multiplexer 414. The reference bit pattern that is supplied to comparator 416 is a predetermined bit pattern that can be either all "0"s 404, all "1"s 406 or a user specified NRZ data sequence 408 that is selected by a separate and independent processing element or system (not shown). Reference comparator 418 then compares the resultant output from the bit sampling flip-flop 410 to the reference bit pattern produced by multiplexer 414 and if the output from bit sampling flip-flop 410 matches the bit pattern produced by the multiplexer 414, nothing is counted. However, if the two patterns do not match then the resultant output from reference comparator 416 is a mismatch that is collected and recorded as a mask violation by the event counter 418. The event counter 418 will increment at the rising edge of each trigger pulse and accumulates the mask violations as "events" for a particular time and voltage level. The events are then forwarded to the processing element or system (not shown) for further processing and evaluation to determine the performance characteristics of the target device or subsystem.

Figure 5:
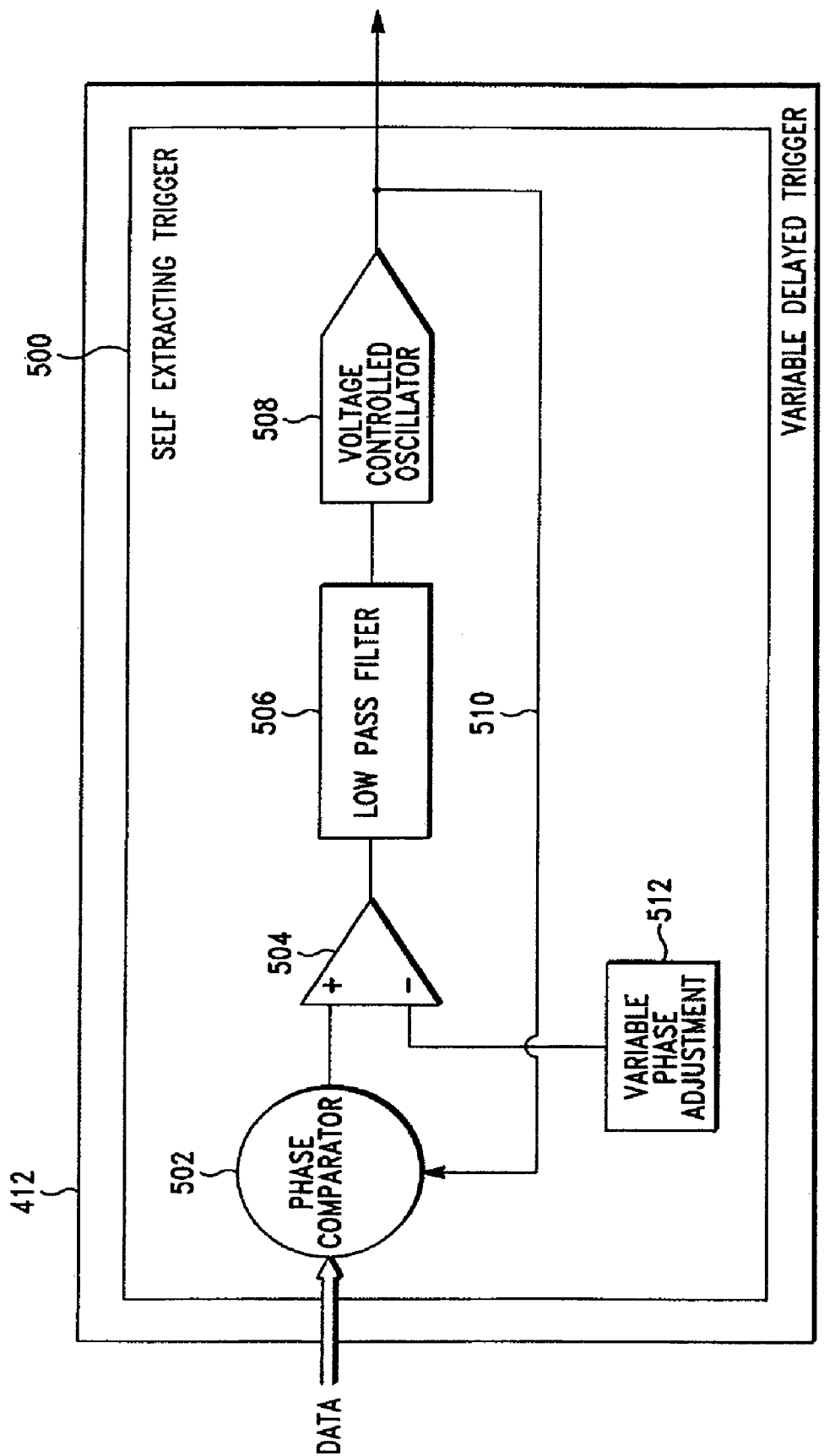
FIG. 5 is a schematic diagram of a variable delay trigger used in accordance with the present invention.

FIG. 5 is a schematic diagram of a variable delay trigger used in accordance with the present invention. As FIG. 5 shows the variable delay trigger 410 that is self-extracting trigger mechanism 500 designed to extract clocking or trigger pulses from an applied data signal. The self-extracting trigger mechanism 500 includes a phase compare 502, a operational amplifier 504, low pass filter 506, voltage-controlled oscillator 508 and a variable phase control 512. The phase compare compares the phase of the incoming bit stream with that of prescribed trigger pulse. The output from the phase comparator 502 as well as a specified voltage from the variable phase adjustment is directed to the operational amplifier 504. The result is then passed to the low pass filter 506 that eliminates any signal inconsistencies. If there is a difference in phase, the voltage-controlled oscillator 508 provides enough of an additional input, as feedback, to the phase comparer 504 to align leading edge of the pulse from the applied signal with the leading edge of the trigger pulse. But by applying a specified voltage from a programmable source like the variable phase controller 512, the phase of the trigger can be adjusted to suit the requirements of a user-specified application by means the variable phase controller 512. By extracting clocking from the applied data signal and supplying it to the self-extracting trigger mechanism 500 for mask tests, the eye mask violation detector 400 is not dependent on the system or device under test to supply the trigger pulse.

Figure 6A:
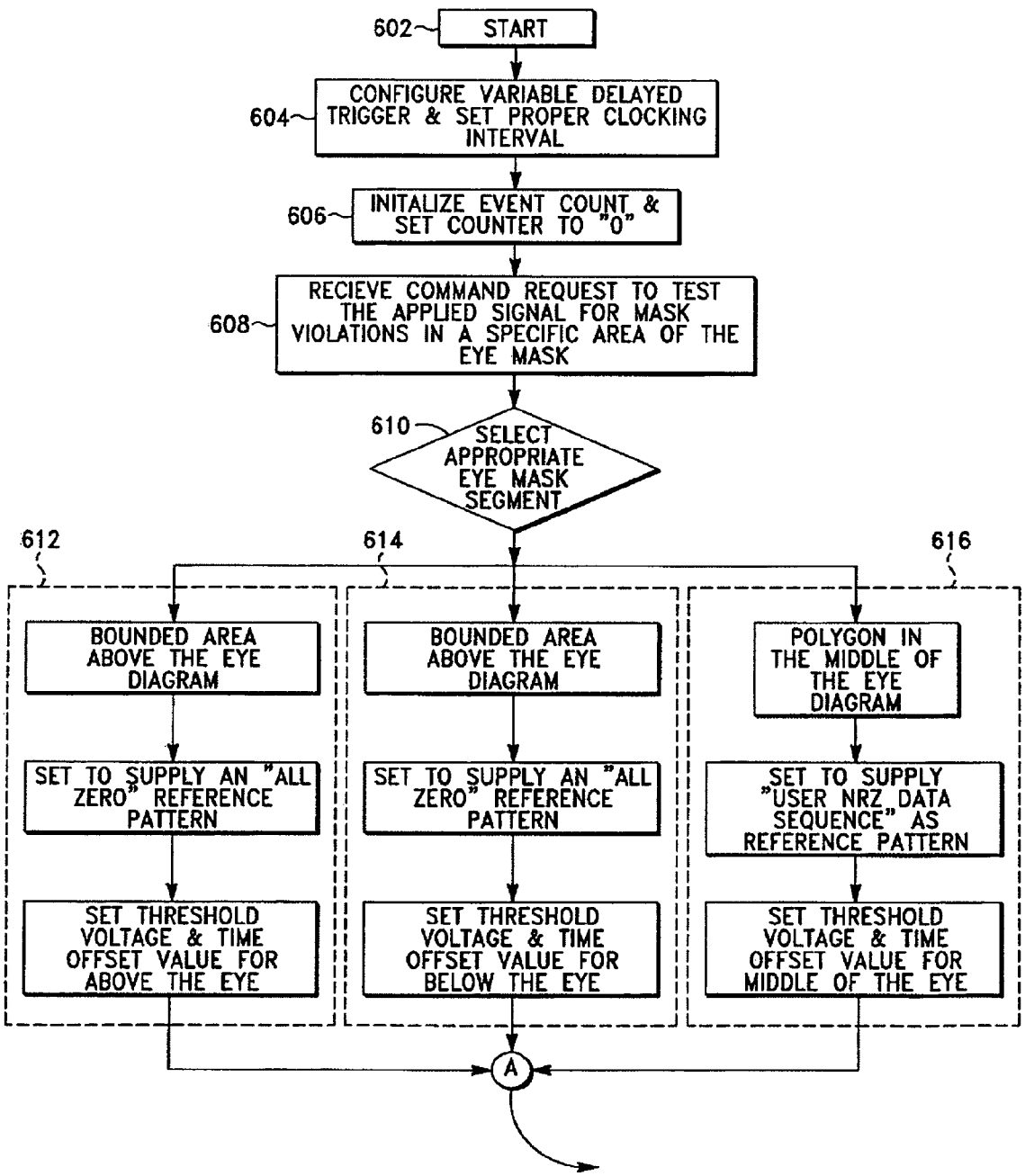
FIG. 6 is a flowchart that illustrates a method of characterizing the performance of an applied signal transmitted from a target device or subsystem in accordance with the present invention as depicted in FIG. 4.

FIG. 6 is a flowchart that illustrates a method of characterizing the performance of an applied signal transmitted from a target device or subsystem using a eye mask test in accordance with the present invention as depicted in FIG. 4. The steps in the flowchart are simply illustrative of the functional steps performed by a binary data bit decision mechanism to accumulate the number of mask violation at various instances in time and voltage offsets for a multi-valued data signal transmitted from either a communication device or subsystem that deviates across the boundaries and into one or more of the bounded areas or zones as defined by an eye mask. At steps 602, 604 and 606, the eye test system or facility is initializing the event counter, configuring the variable delayed trigger to supply the proper trigger pulse. At Step 606, the eye mask test facility or system receives a command request to test the applied data signal for mask violations in a specific portion of the eye mask from the program element or system. The appropriate segment of the eye mask, at step 610, is then selected. Upon selecting either the segment above, or below or the polygon in the middle of the eye diagram, the test facility or system, controlled from the program element or system sets the multiplexer to supply the proper reference pattern and set the threshold voltage and time interval values, as well. To determine mask violations in the bounded area above the eye diagram, at step 612, the multiplexer is set to supply a reference bit pattern of all "0"s and the initial threshold voltage-time interval values above the eye diagram are specified. For mask violations in the bounded area below the eye diagram, at step 614, the multiplexer is set to supply a reference bit pattern of all "1"s and the initial threshold voltage-time interval values below the eye diagram are specified. Lastly, to determine the mask violations in the polygon bounded area in the middle of the eye diagram, at step 616, the multiplexer supplies a reference bit pattern a NRZ data sequence and the initial threshold voltage-time interval values that are in the middle of the eye diagram are specified.

Figure 6B:
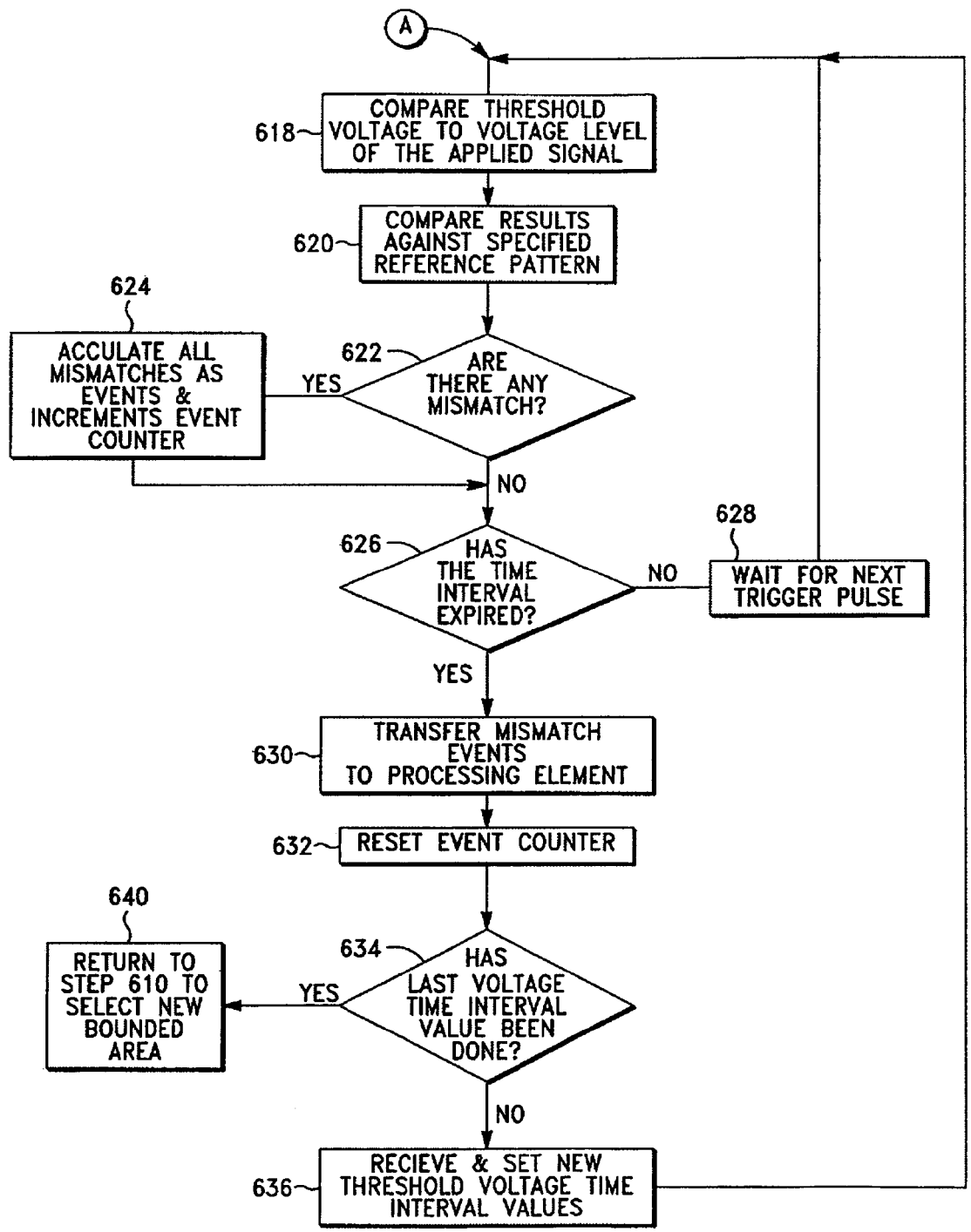

As FIG. 6b shows, at step 618, the threshold voltage is applied to the decision comparator and if the voltage level of the applied data signal exceeds the voltage threshold ($V_T$), at step 620, it is compared with the supplied reference bit pattern from the multiplexer. If there are mismatches, at step 624, the event counter is incremented and the mismatches, now considered events, are accumulated for specified period of time. The count of these "events" depicts the number of times the applied data signal deviates into either the upper bounded area or the lower bounded area or into the bounded area in the middle of the eye diagram. If, at step 626, the time interval has not expired, the process, at step 628, waits for the next trigger to "fire." Once the reference trigger has "fired" the process of accumulating of the applied data signal that includes steps 620-624 is repeated until time expires. If time interval has expired, at step 626, the number of events accumulated by the event counter, at step 630, is then transferred to the program element or system for additional processing. Once the transfer has been completed, at step 632, the event counter is reset while, at step 636, the next threshold voltage-time interval point is set and steps 618-632 are repeated until all threshold voltage-time interval points have been completely processed. When the last threshold voltage-time interval setting point has been processed for that particular bounded area, the eye mask testing process, at step 640, returns to step 610 to continue the eye mask test, allowing the processing element or system to select a new bounded area for evaluation. This selection process continues until all of the bounded area in the eye mask has been used.

Foregoing described embodiments of the invention are provided as illustrations and descriptions. Other variations and embodiments are possible in light of above teachings, and it is thus intended that the scope of invention not be limited by this Detailed Description, but rather by subsequent claims. In addition, numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

What is claimed is:

1. An apparatus for performing an eye mask test for an applied mutli-valued data signal that is transmitted from a high-speed communications device or subsystem comprising:
   a decision comparator;
   a bit sampling flip-flop;
   a variably delayed trigger;
   a reference comparator that compares a resultant bit stream produced by the bit sampling flip-flop with a reference bit pattern;
   a multiplexer that supplies at least one reference data pattern to the reference comparator, the pattern consists of all ones and is used to determine the number of times the applied data signal deviates into the upper bounded area of the eye mask; and
   an event counter for accumulating the resultant output from the reference comparator and transferring said results to a program system for processing.

2. The apparatus as recited in claim 1 wherein the decision comparator receives a specified threshold voltage and compares the threshold voltage against the voltage level of the applied multi-valued data signal comparator and transferring said results to a program system for processing.

3. The apparatus as recited in claim 1, wherein the output from the decision comparator goes high when the rising of the trigger pulse occurs, it enables the bit sampling flip-flop to be latched high.

4. The apparatus as recited in claim 1, wherein the trigger function supplied by the variable delayed trigger is derived from the supplied clock of a system under evaluation.

5. The apparatus as recited in claim 1, wherein the trigger function supplied by the variably delayed trigger is derived from the data rate of the applied data signal.

6. The apparatus as recited in claim 1, wherein the multiplexer supplies a data pattern that contains all zeros to the reference comparator used to determine the number of times the applied data signal deviates into the lower bounded area of the eye mask.

7. The apparatus as recited in claim 1, wherein the multiplexer supplies a data pattern that comprises an NRZ data sequence to the reference comparator used to determine the number of times an applied data signal deviates into the polygon shaped bounded area in the center of the eye mask.

8. The apparatus as recited in claim 1, wherein the bit stream from the reference comparator containing a plurality of mismatches, indicating that the applied data signal has deviated into the bounded area of the mask for a particular threshold voltage and interval of time is accumulated by the event counter.

9. The apparatus as recited in claim 8, wherein the reference comparator generates a sequence of matches, indicating that the applied data signal has not deviated across one of the bounded areas of the mask for a particular threshold voltage and interval of time, are not counted in the event counter.

10. The apparatus as recited in claim 1, wherein the multiplexer supplies a reference data pattern comprising of all zeros to the reference comparator that is used to determine the number of times the applied data signal deviates into the bounded area positioned below the eye mask.

11. The apparatus as recited in claim 10, wherein the multiplexer supplies a data pattern comprising of NRZ data sequence to the reference comparator that is then used to determine the number of times an applied data signal deviates into the polygon shaped bounded area in the center of the eye mask.

12. A method of performing a complete eye test that measures and characterizes the performance of an applied multi-valued data signal, performed by an eye mask violation detector comprising the steps of:
   testing for mask violations of the applied data signal produced for a particular bounded area of the eye mask, wherein mask violations correspond to the number of times a data signal deviates into a particular bounded area at a specified threshold and interval of time;
   configuring a variable delayed trigger to generate a plurality of trigger pulses synchronous to the bit rate of the applied data signal;
   selecting the appropriate bounded area of the eye mask to test;
   comparing the voltage level of the applied data signal with the threshold voltage supplied to a decision comparator;
   comparing the results from the decision comparator with a reference bit pattern, wherein any differences between the output of the decision comparator and the reference comparator result in a mismatched signal being provided to an event counter; and accumulating any mismatched events contained in the resultant output from the reference comparator; and
   if the bounded area below the eye is selected, performing the additional steps of setting the appropriate threshold voltage and time intervals that define a line below the eye and generating the reference bit pattern supplied to the reference comparator containing all ones are performed.

13. The method as recited in claim 12, wherein if the polygon shaped bounded area in the middle of the eye is selected, performing the additional steps of setting the appropriate threshold voltage and time intervals that define a line around the inside of the eye and generating the reference bit pattern supplied to the reference comparator containing a user specified NRZ bit sequence are performed.

14. The method as recited in claim 13, wherein if the time interval has not expired, the process waits for the next trigger pulse to occur in order to continue the process of accumulating mismatch events until the time interval has expired.

15. The method as recited in claim 13, wherein if time interval has expired, the number of mismatched events accumulated is then transferred to a program element for additional processing.

16. The method as recited in claim 15, wherein after the transfer is complete, performing the further steps of resetting the event counter, setting the next threshold voltage and time interval point, and continuing to accumulate and transfer all mismatched events to the other threshold voltage-time interval setting points until all threshold voltage-time interval points have been completely processed.

17. The method as recited in claim 16, wherein when the last threshold voltage-time interval setting point has been processed for a particular bounded area, the processing element selects a new bounded area and repeats all steps required to perform the eye mask test until each bounded area has been done.

18. The method as recited in claim 12, wherein when the area above the eye is selected, the additional steps of setting the appropriate threshold voltage and time intervals that define a line above the eye and generating the reference bit pattern supplied to the reference comparator containing all zeros are performed.

19. An eye mask violation detector, comprising:
  means for receiving program instructions to test for mask of an applied data signal produced for a particular bounded area of an eye mask, wherein mask violations are the number of times a data signal deviates into a particular bounded area at a specified threshold voltage and interval of time;
  means for configuring a variable delayed trigger to generate a plurality of trigger pulses synchronous to the bit rate of the applied data signal;
  means for selecting appropriate bounded area of the eye to test in accordance with the received program instruction;
  means for comparing the voltage level of the applied data signal with the threshold voltage supplied to a decision comparator;
  means for comparing the comparative results from the decision comparator with a reference bit pattern supplied to a reference comparator; and
  means for accumulating any mismatched events contained in the resultant output from the reference comparator, such that when the bounded area above the eye is selected, the additional steps of setting the appropriate threshold voltage and time intervals that define a line above the eye and generating the reference bit pattern supplied to the reference comparator containing all zeros are performed.

20. The eye mask violation detector as recited in claim 19, further including means for performing the additional steps of setting the appropriate threshold voltage and time intervals that define a line below the eye and generating the reference comparator containing all ones when the bounded area below the eye is selected.

21. The eye mask violation detector as recited in claim 19, further including means for performing the additional steps of setting the appropriate threshold voltage and time intervals that define a line around the inside of the eye and generating the reference bit pattern supplied to the reference comparator containing a user specified NRZ bit sequence when the polygon shaped bounded are in the middle of the eye is selected.

22. The eye mask violation detector as recited in claim 21, further including means for waiting for the next trigger pulse to occur to continue the process of accumulating mask violations until the time interval has expired.

23. The eye mask violation detector as recited in claim 21, further including means for transferring the number is mismatched events to a program element for additional processing.

24. The eye mask violation detector as recited in claim 23, further icluding means for resetting the event counter, setting the next threshold voltage and time interval points, and continuing to accumulate and transfer all mismatched events for the other threshold voltage-time interval setting points until all threshold voltage-time interval points have been completely processed.

25. The eye mask violation detector as recited in claim 24, when the last threshold voltage-time interval setting point has been processed for a particular bounded area, the processing element selects a new bounded area and repeats all steps required to perform the eye mask test until each bounded area has been done.

26. A system for performing a complete eye test that measures and characterizes the performance of an applied multi-valued data signal, performed by a eye mask violation detector, comprising:
  circuitry for receiving program instructions to test for mask violations of the applied data signal produced for a particular bounded area of the eye mask, wherein the mask violations are the number of times a data signal deviates into a particular bounded area at a specified threshold voltage and interval of time;
  circuitry for configuring variable delayed trigger to generate a plurality of trigger pulses equivalent to bit rate of the applied data signal:
  circuitry for electing appropriate bounded area of the eye mask to test in accordance with the received program instruction;
  circuitry for comparing the voltage level of the applied data signal with the threshold voltage supplied to a decision comparator;
  circuitry for comparing the comparative results from the decision comparator with a reference bit pattern supplied to a reference comparator; and
  circuitry for accumulating any mismatched events contained in the resultant output from the reference comparator such that when the bounded area above the eye is selected, the additional steps of setting the appropriate threshold voltage and time intervals that define a line above the eye and generating the reference bit pattern supplied to the reference comparator containing all zeros are performed.

27. The system as recited in claim 26, wherein if the bounded area below the eye is selected, the additional steps of setting the appropriate threshold voltage and time intervals that define a line below the eye and generating the reference bit pattern supplied to the reference comparator containing all ones.

28. The system as recited in claim 26, wherein if the polygon shaped bounded area in the middle of the eye is selected, the additional steps of setting the appropriate threshold voltage and time intervals that define a line around the inside of the eye and generating the reference bit pattern supplied to the reference comparator containing a user specified NRZ bit sequence are performed.

29. The system as recited in claim 28, wherein if the time interval has not expired, the process waits for the next trigger pulse to occur in order to continue to process of accumulating mask violations until the time interval has expired.

30. The system as recited in claim 28, wherein if time interval has expired, the number of mismatched events accumulated is then transferred to a program element for additional processing.

31. The system as recited in claim 30, after the transfer is complete, the further steps of resetting the event counter, setting the next threshold voltage and time interval point, and continuing to accumulate and transfer all mismatched events for the other threshold voltage-time interval setting points until all threshold voltage-time interval point have been completely processed, are performed.

32. The system as recited in claim 31, when the last threshold voltage-time interval setting point has been processed for a particular bounded area, the processing element selects a new bounded area and repeats all steps required to perform the eye mask test until each bounded areas have been done.

* * * * *